(12) United States Patent
Resch (10) Patent No.: US 12,204,798 B2
(45) Date of Patent: *Jan. 21, 2025

(54) ACCESS ANOMALY NOTIFICATION IN A STORAGE NETWORK

(71) Applicant: Pure Storage, Inc., Santa Clara, CA (US)

(72) Inventor: Jason K. Resch, Warwick, RI (US)

(73) Assignee: Pure Storage, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/502,320

(22) Filed: Nov. 6, 2023

(65) Prior Publication Data

US 2024/0069813 A1 Feb. 29, 2024

Related U.S. Application Data (63) Continuation of application No. 18/149,363, filed on Jan. 3, 2023, now Pat. No. 11,822,824, which is a continuation of application No. 17/301,470, filed on Apr. 5, 2021, now Pat. No. 11,567,702, which is a continuation of application No. 16/554,939, filed on Aug. 29, 2019, now Pat. No. 10,996,895, which is a
(Continued)

(51) Int. Cl.
*G06F 3/06* (2006.01)
*G06F 3/00* (2006.01)
*G06F 11/10* (2006.01)

(52) U.S. Cl.
CPC ............ *G06F 3/0659* (2013.01); *G06F 3/061* (2013.01); *G06F 3/0619* (2013.01); *G06F 3/064* (2013.01); *G06F 3/0647* (2013.01); *G06F 3/0653* (2013.01); *G06F 3/067* (2013.01); *G06F 3/0689* (2013.01); *G06F 11/1076* (2013.01)

(58) Field of Classification Search
CPC ...... G06F 3/0659; G06F 3/0619; G06F 3/064; G06F 3/0647; G06F 3/0653; G06F 3/0689; G06F 11/1076
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay |
| (Continued) | | |

OTHER PUBLICATIONS

Chung; An Automatic Data Segmentation Method for 3D Measured Data Points; National Taiwan University; pp. 1-8; 1998.
(Continued)

*Primary Examiner* — Justin R Knapp
(74) *Attorney, Agent, or Firm* — Garlick & Markison; Timothy W. Markison; Bruce E. Stuckman (57) ABSTRACT

A processing system operates by: detecting an access anomaly associated with an access request from a requestor for a set of encoded data slices, the access anomaly having an unfavorable access pattern, wherein the set of encoded data slices is dispersed storage error encoded and stored in at least one storage unit of the storage network; denying the access request in response to detecting the access anomaly; generating, based on the unfavorable access pattern, an anomaly detection indicator identifying the requestor; and sending the anomaly detection indicator to other devices of the storage network.

20 Claims, 8 Drawing Sheets

Related U.S. Application Data continuation of application No. 15/841,863, filed on Dec. 14, 2017, now Pat. No. 10,437,515, which is a continuation-in-part of application No. 15/837,705, filed on Dec. 11, 2017, now Pat. No. 10,387,070, which is a continuation-in-part of application No. 15/006,735, filed on Jan. 26, 2016, now Pat. No. 10,079,887.

(60) Provisional application No. 62/140,861, filed on Mar. 31, 2015.

(56) References Cited

U.S. PATENT DOCUMENTS

| | | |
|---|---|---|
| 5,485,474 A | 1/1996 | Rabin |
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Nikolaevich |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,406,653 B2 | 7/2008 | Ide |
| 7,636,724 B2 | 12/2009 | De La Torre |
| 7,793,138 B2 * | 9/2010 | Rastogi .............. H04L 63/1458 726/22 |
| 8,386,840 B2 | 2/2013 | Stougie |
| 8,572,736 B2 * | 10/2013 | Lin .................... G06F 11/0706 713/188 |
| 9,083,789 B2 | 7/2015 | Dicke |
| 9,465,837 B1 | 10/2016 | Ross |
| 9,632,872 B2 | 4/2017 | Dhuse |
| 9,735,967 B2 | 8/2017 | Leggette |
| 10,114,887 B1 | 10/2018 | Cheng |
| 10,180,809 B2 | 1/2019 | Fetik |
| 10,713,374 B2 | 7/2020 | Algie |
| 11,204,836 B1 | 12/2021 | Resch |
| 11,276,287 B2 * | 3/2022 | Oppenheimer ....... H04W 4/029 |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2006/0277184 A1 | 12/2006 | Faitelson et al. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2009/0094251 A1 | 4/2009 | Gladwin |
| 2009/0094318 A1 | 4/2009 | Gladwin |
| 2010/0023524 A1 | 1/2010 | Gladwin |
| 2011/0107185 A1 | 5/2011 | Grube |
| 2011/0126060 A1 | 5/2011 | Grube |
| 2013/0232503 A1 | 9/2013 | Volvovski |
| 2013/0346563 A1 | 12/2013 | Huang |
| 2014/0279104 A1 | 9/2014 | Grube |
| 2014/0281417 A1 | 9/2014 | Peters |
| 2014/0351300 A1 | 11/2014 | Uppu |
| 2014/0379714 A1 * | 12/2014 | Hankins .............. G06F 11/3082 707/737 |
| 2015/0355957 A1 * | 12/2015 | Steiner .................. G06F 21/552 714/37 |
| 2019/0190844 A1 | 6/2019 | Resch |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

(56) References Cited

OTHER PUBLICATIONS

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

\* cited by examiner

ACCESS ANOMALY NOTIFICATION IN A STORAGE NETWORK

CROSS-REFERENCE TO RELATED APPLICATIONS

The present U.S. Utility Patent Application claims priority pursuant to 35 U.S.C. § 120 as a continuation of U.S. Utility application Ser. No. 18/149,363, entitled "Processing Access Anomalies in a Storage Network", filed Jan. 3, 2023, which is a continuation of U.S. Utility application Ser. No. 17/301, 470, entitled "Resolving Detected Access Anomalies in a Vast Storage Network", filed Apr. 5, 2021, issued as U.S. Pat. No. 11,567,702 on Jan. 31, 2023, which is a continuation of U.S. Utility application Ser. No. 16/554,939, entitled "Selecting A Subset Of Storage Units In A Dispersed Storage Network", filed Aug. 29, 2019, issued as U.S. Pat. No. 10,996,895 on May 4, 2021, which is a continuation of U.S. Utility application Ser. No. 15/841,863, entitled "Selecting Storage Units In A Dispersed Storage Network", filed Dec. 14, 2017, issued as U.S. Pat. No. 10,437,515 on Oct. 8, 2019, which is a continuation-in-part of U.S. Utility application Ser. No. 15/837,705, entitled "Adding Incremental Storage Resources In A Dispersed Storage Network", filed Dec. 11, 2017, issued as U.S. Pat. No. 10,387,070 on Aug. 20, 2019, which is a continuation-in-part of U.S. Utility application Ser. No. 15/006,735, entitled "Modifying Storage Capacity Of A Set Of Storage Units", filed Jan. 26, 2016, issued as U.S. Pat. No. 10,079,887 on Sep. 18, 2018, which claims priority pursuant to 35 U.S.C. § 119(e) to U.S. Provisional Application No. 62/140,861, entitled "Modifying Storage Capacity Of A Storage Unit Pool", filed Mar. 31, 2015, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
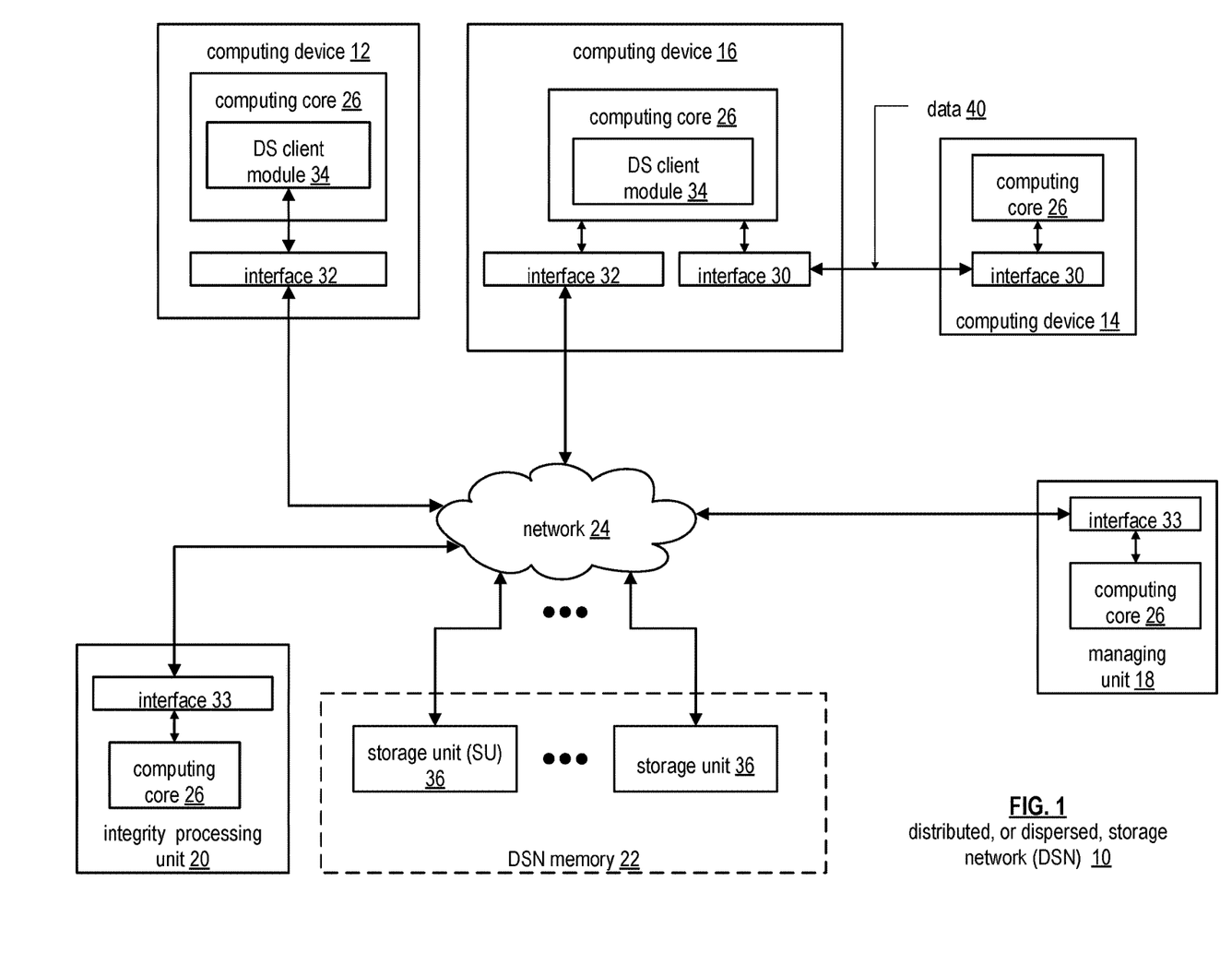
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
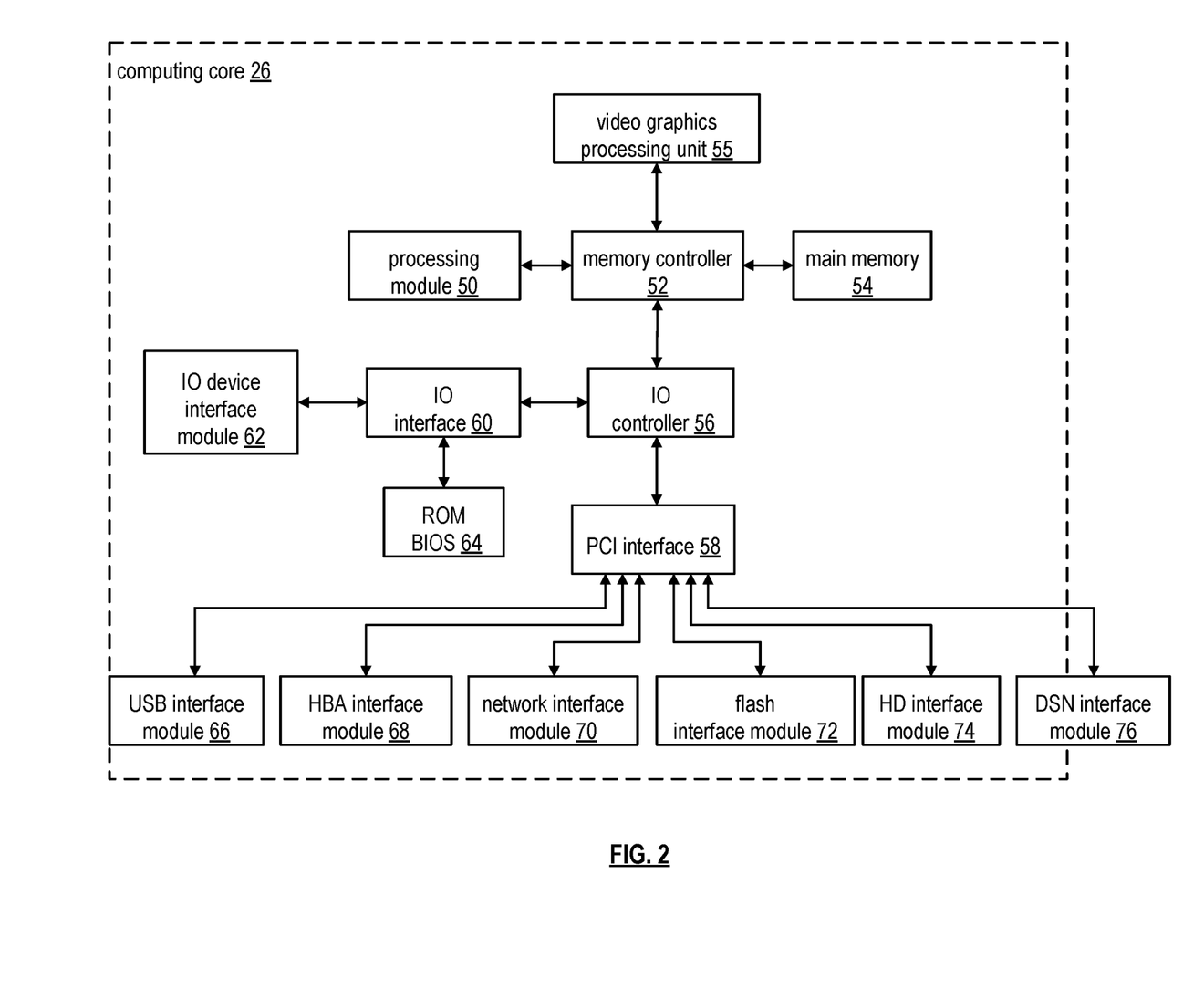
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
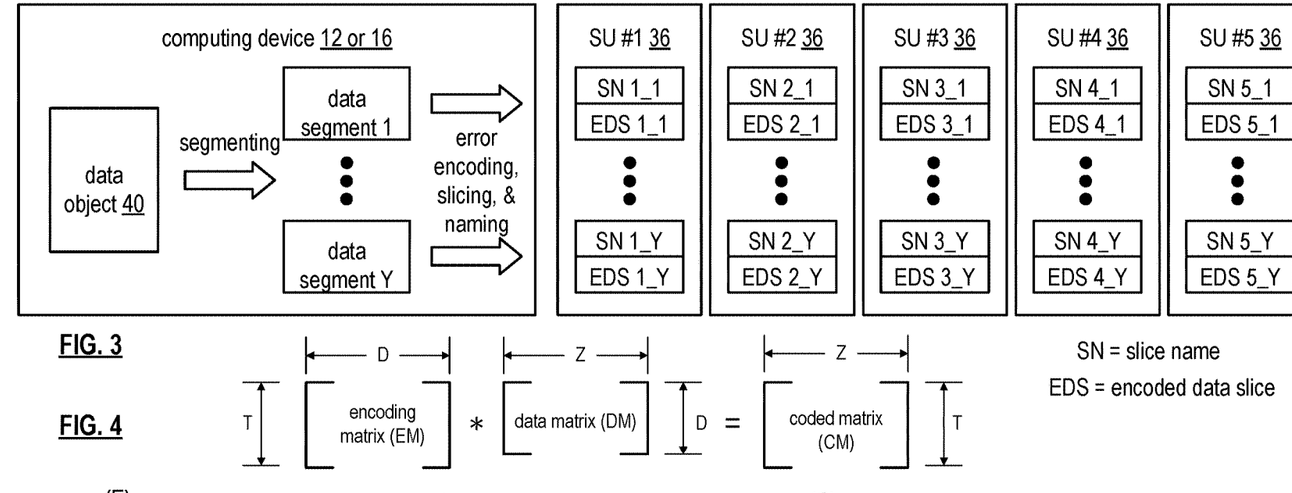
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
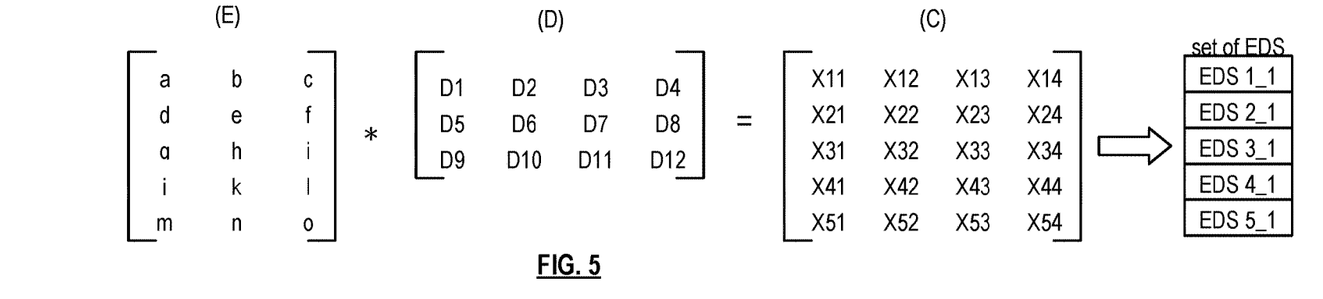
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
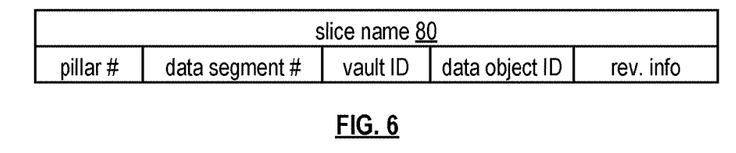
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
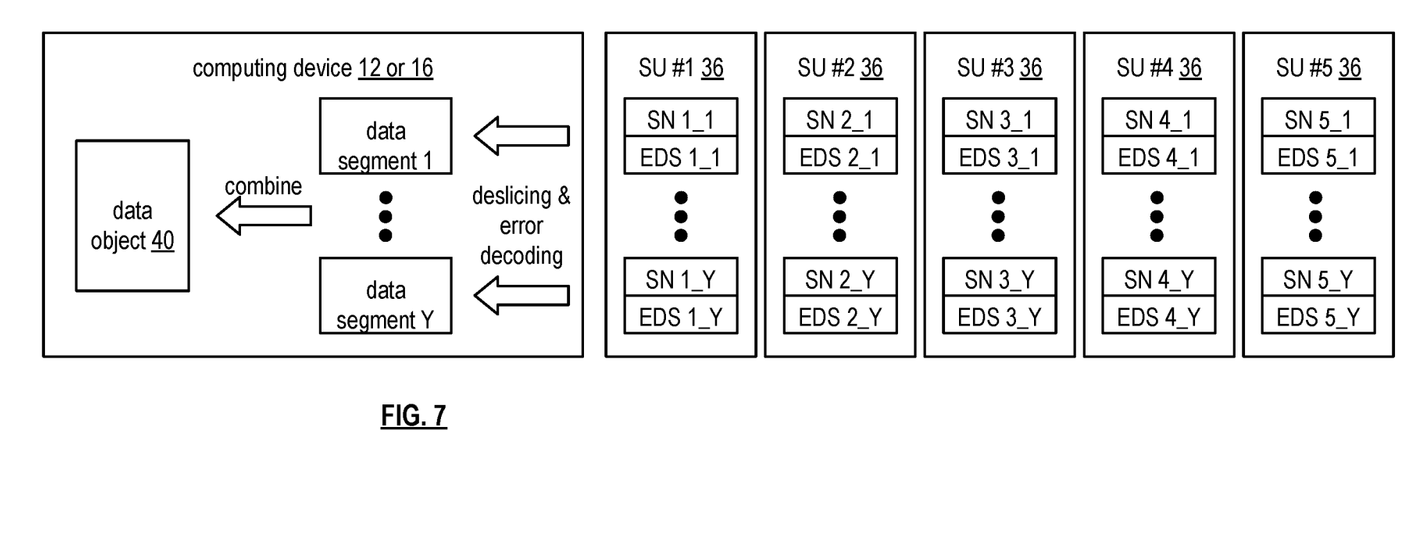
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
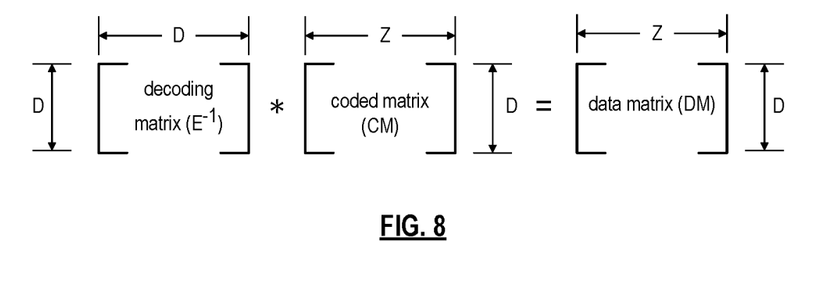
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
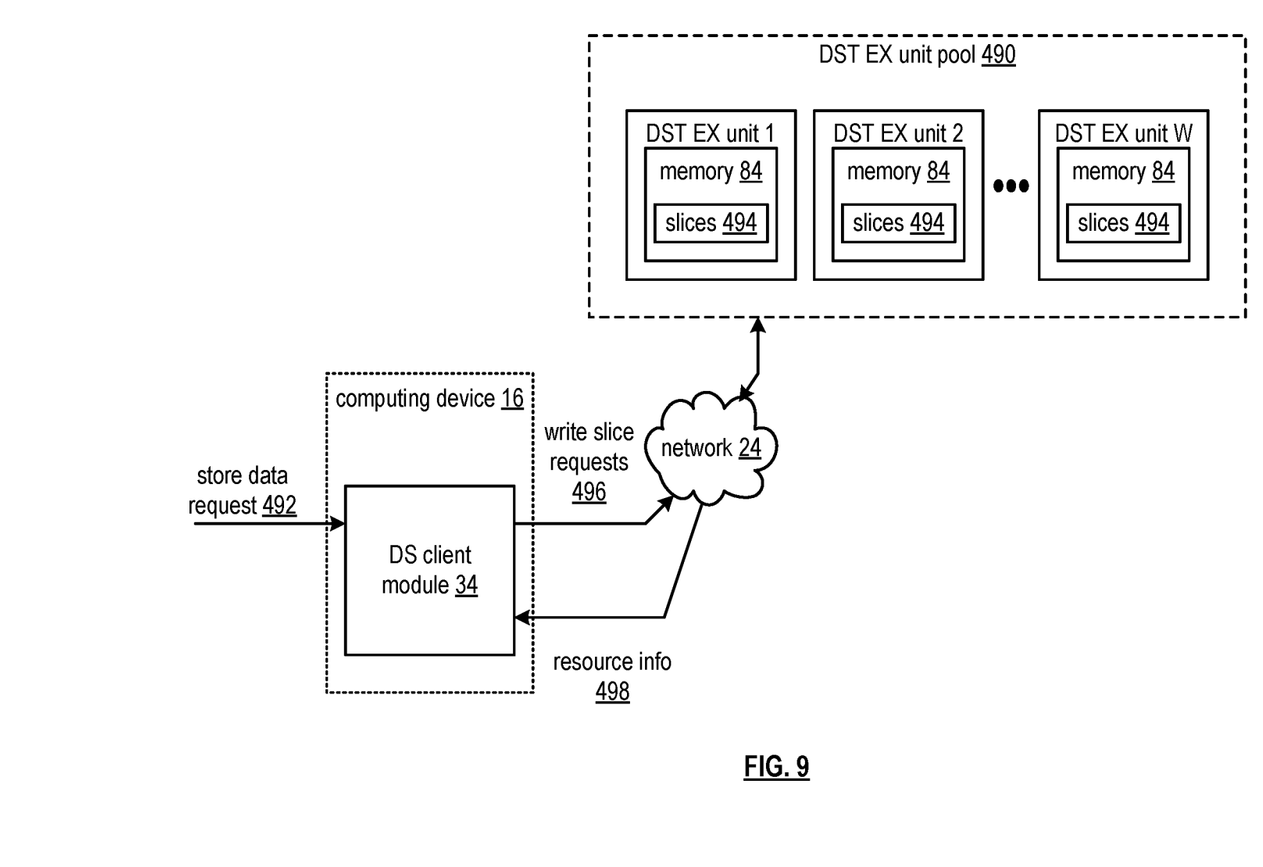
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes the computing device 16 of FIG. 1, the network 24 of FIG. 1, and a DST execution (EX) unit pool 490. The computing device 16 includes the DS client module 34 of FIG. 1. The DST execution unit pool 490 includes a set of at least W number of DST execution units (e.g., DST execution units 1-W). Each DST execution unit can include a memory 84, which can be implemented utilizing the memory 54 of FIG. 2 or another memory device. Each DST execution may be implemented utilizing the storage unit 36 of FIG. 1.

The DSN functions to select storage units for storage of sets of encoded data slices 494, where a data object is dispersed storage error encoded utilizing an information dispersal algorithm (IDA) to produce a plurality of sets of encoded data slices 494, where each set of encoded data slices includes an IDA width number=W of encoded data slices, and where a write threshold number=S of encoded data slices of each set of encoded data slices are stored and maintained in accordance with the rebuilding function (e.g., from time to time, missing and/or corrupted encoded data slices are replaced with rebuilt encoded data slices to maintain the write threshold number of encoded data slices for each set of encoded data slices).

In a write-all configuration where there are a width number of slices to be written, and a width number of possible locations to write them, there may be no possible optimization for selecting the write location, as there is only one possibility. However, when the number of slices to be written (S) is less than the number of possible storage locations (W), there are (W choose S) possible combinations for how to select a unique S locations out of the W possible, where the (W choose S) function is defined as (W!/((S!*(W−S)!)), where ! is the factorial operator.

Write ranking can be used by a computing device to select the optimal single choice out of the (W choose S) possible patterns of issuing writes. The selection process can be optimized according to historical performance, storage unit utilization, storage unit response times, storage utilization of storage units, and/or round-robin style load-leveling, among other possibilities. Once the computing device makes the selection of which S storage units to issues write requests to, it can submit the write requests to the selected S storage units.

In an example of operation of the selecting of the storage units, the DS client module 34 obtains resource information 498 for at least some DST execution units of the DST execution unit pool 490. The resource information 498 can include one or more of a storage unit access latency level, a storage unit processing capability level, a storage unit utilization level, an available storage capacity, a storage unit availability level, and/or a storage unit reliability level. The obtaining can include at least one of interpreting a query response, interpreting an error message, interpreting a test result, interpreting a historical log of performance, and/or receiving the resource information. For example, the DS client module 34 receives, via the network 24, the resource information 498 from the DST execution units 1-W.

Having obtained the resource information 498, the DS client module 34 can receive a store data request 492. The store data request 492 can include one or more of a data object for storage, a store data request indicator, and/or a name that corresponds to the data object for storage. Having received the store data request 492, the DS client module 34 can identify W available DST execution units of the DST execution unit pool 490 as candidates for utilization of storing of at least some encoded data slices of each set of encoded data slices. The identifying can be based on one or more of the resource information 498, an interpretation of an error message, and/or an interpretation of a status query response. For example, the DS client module 34 selects all of DST execution units 1-W when each DST execution unit is associated with favorable resource information (e.g., performance greater than a minimal performance threshold level).

Having identified the available DST execution units, the DS client module 34 identifies a plurality of combinations of selecting S number of DST execution units of the W available DST execution units. For example, the DS client module 34 identifies the plurality of combinations utilizing the formula, combination=W choose S=(W!/((S!*(W−S)!)). For each combination, the DS client module 34 assigns a rating level based on the resource information. The assigning includes interpreting the resource information associated with the selection of S DST execution units to produce the rating level. For example, a more favorable rating level is assigned when a more favorable performance level is associated with the particular combination of DST execution units. As another example, a more favorable rating is assigned when a more favorable storage capacity level is associated with the particular combination of DST execution units.

Having assigned the rating levels to each of the combinations, the DS client module 34 can select one combination based on one or more of the rating levels, a round-robin approach, a load leveling approach, a distributed agreement protocol function ranking, a predetermination, and/or a request. For example, the client module 34 selects a highest rating level. As another example, the DS client module 34 utilizes the round-robin approach when two or more combinations are associated with a common highest rating level. In various embodiments, the DS client module identifies a plurality of permutations of selecting the S number of DST execution units of the W available DST execution units, and selects from the plurality of permutations in the same fashion of selecting from the plurality of combinations.

Having selected the one combination, the DS client module 34 can facilitate storage of the data object of the store data request as a plurality of sets of encoded data slices in DST execution units associated with the selected combination, where S of the encoded data slices for each set of encoded data slices are stored in the associated DST execution units (e.g., S number) of the selected combination. For example, the DS client module 34 dispersed storage error encodes the data object to produce the plurality of sets of encoded data slices, selects S encoded data slices from each set of encoded data slices, and issues, via the network 24, a write slice request 496 to each corresponding DST execution unit of the selected S storage units, where the write slice requests 496 includes the selected S encoded data slices 494 from each set of encoded data slices.

In various embodiments, a processing system of a computing device includes at least one processor and a memory that stores operational instructions, that when executed by the at least one processor cause the processing system to obtain resource information for a subset of storage units of a storage unit pool. W available storage units of the storage unit pool are identified in response to receiving a store data request. W choose S combinations of selecting S number of storage units of the W available storage units are identified. A plurality of rating levels is calculated based on the resource information, where each of the plurality of rating levels are assigned to a corresponding combination of the W choose S combinations. One combination of the W choose S combinations is selected based on the plurality of rating levels. Storage of data of the store data request is facilitated utilizing the S number of storage units of the selected one combination.

In various embodiments, obtaining the resource information includes interpreting a performance log. In various embodiments, identifying the W available storage units is based on the resource information. In various embodiments, calculating the plurality of rating levels is based on access performance metrics and storage availability metrics of the resource information.

In various embodiments, selecting the one combination includes identifying a highest rated combination of the W choose S combinations. In various embodiments, selecting the one combination includes selecting from a plurality of highest rated combinations utilizing one of a random selection and/or a round-robin selection. In various embodiments, facilitating storage of the data includes dispersed storage error encoding the data to produce at least one set of encoded data slices and storing the at least one set of encoded data slices in the S number of storage units of the selected one combination.

Figure 10:
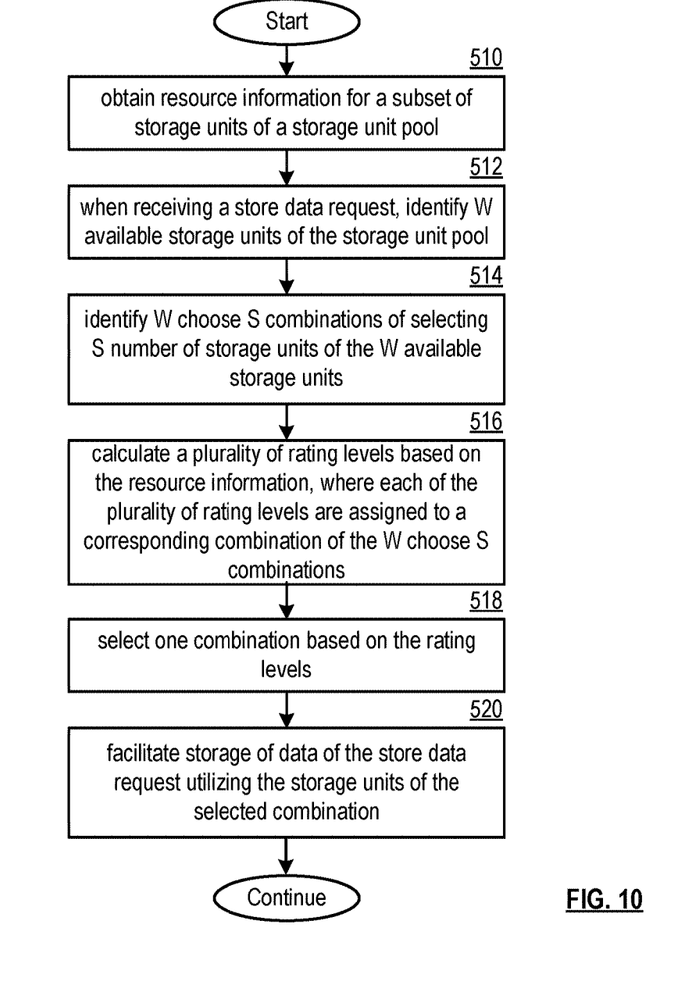
FIG. 10 is a logic diagram of an example of a method of selecting storage units in accordance with the present invention.

FIG. 10 is a flowchart illustrating an example of selecting storage units. In particular, a method is presented for use in association with one or more functions and features described in conjunction with FIGS. 1-9, for execution by a computing device that includes a processor or via another processing system of a dispersed storage network that includes at least one processor and memory that stores instruction that configure the processor or processors to perform the steps described below.

The method includes step 510 where a processing system (e.g., of a distributed storage and task (DS) client module and/or a computing device) obtains resource information for least some storage units of a storage unit pool. The obtaining can include at least one of interpreting a query request, interpreting an error message, interpreting a test result, interpreting a performance log, and/or receiving the resource information. When receiving a store data request, the method continues at step 512 where the processing system identifies W available storage units of the storage unit pool. The identifying may be based on one or more of the resource information, interpreting system registry information, and receiving identities of the W available storage units.

The method continues at step 514 where the processing system identifies W choose S combinations of selecting S number of storage units of the W available storage units. For example, the processing system calculates W choose S for each combination. For each combination, the method continues at step 516 where the processing system calculate a plurality of rating levels based on the resource information, where each of the plurality of rating levels are assigned to a corresponding combination of the W choose S combinations. The assigning may be based on one or more portions of the resource information (e.g., access performance, storage availability).

The method continues at step 518 where the processing system selects one combination based on the rating levels. The selecting can include at least one of identifying a highest rated combination or selecting from a plurality of highest rated combinations utilizing at least one of a random selection, a round-robin selection, and/or a predetermination. The method continues at step 520 where the processing system facilitates storage of data of the store data request utilizing the storage units of the selected combination. For example, the processing system dispersed storage error encodes the data to produce encoded data slices, and stores S encoded data slices for each set of encoded data slices at S storage units of the selected combination.

In various embodiments, a non-transitory computer readable storage medium includes at least one memory section that stores operational instructions that, when executed by a processing system of a dispersed storage network (DSN) that includes a processor and a memory, causes the processing system to obtain resource information for a subset of storage units of a storage unit pool. W available storage units of the storage unit pool are identified in response to receiving a store data request. W choose S combinations of selecting S number of storage units of the W available storage units are identified. A plurality of rating levels is calculated based on the resource information, where each of the plurality of rating levels are assigned to a corresponding combination of the W choose S combinations. One combination of the W choose S combinations is selected based on the plurality of rating levels. Storage of data of the store data request is facilitated utilizing the S number of storage units of the selected one combination.

Figure 11:
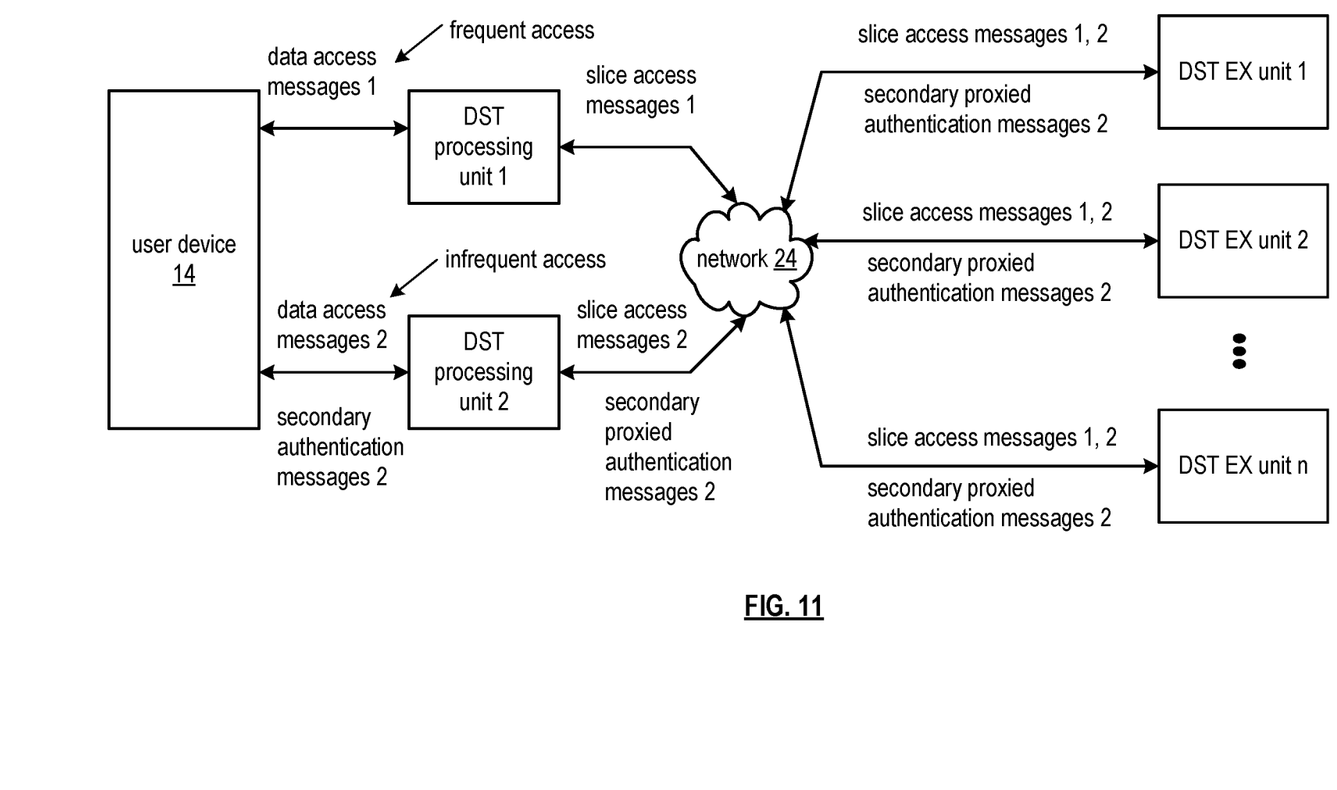
FIG. 11 is a schematic block diagram of another embodiment of a dispersed storage network (DSN) in accordance with the present invention.

FIG. 11 is a schematic block diagram of another embodiment of a dispersed storage network (DSN) that includes the user device 14 of FIG. 1, at least two distributed storage and task (DST processing units 1-2, the network 24 of FIG. 1, and a set of DST (EX) execution units 1-n. The DST processing units 1-2 may be implemented utilizing the DST processing unit 16 of FIG. 1. Each DST execution unit may be implemented utilizing the DST execution unit 36 of FIG. 1.

The DSN functions to resolve a detected access anomaly. The access anomaly includes a data access pattern invoked by the user device 14 to the set of DST execution units via one of the DST processing units 1-2 that is different by at least a difference threshold level than a historical and typical data access pattern. Specific examples of the access anomaly includes one or more of attempting access from a location that has never historically been used to initiate access, such as from a different Internet service provider, from a different Internet protocol address, and from a different remote physical location; too many failed authentication attempts in a row (e.g., a bad login password); an access pattern that statistically deviates from a normal access pattern; and an access type that requires a second level authentication check due to significance of the access type (e.g., a change of credentials, extending of a user permission, and deleting a significant amount of data).

In an example of operation of the resolving of the detected access anomaly, while monitoring typical access of the user device 14 via the DST processing unit 1 (e.g., processing data access message is 1 on a frequent basis), issuing slice access messages 1, via the network 24, to the set of DST execution units 1-*n*, DST execution unit 3 detects access by the user device 14 via the DST processing unit 2 (e.g., receiving a data access message 2) and issuing, via the network 24, slice access messages 2 to the DST execution unit 3, and determines that the access via the DST processing unit 2 deviates from typical access thus identifying the detected anomaly.

Having detected the access anomaly, the DST execution unit 3 queues the slice access message 2. The queuing includes at least one of storing the slice access message 2 locally in the DST execution unit 3 and sending an anomaly detection indicator to other DST execution units. Having queued the request, the DST execution unit 3 initiates a secondary authentication process with the user device 14. For example, the DST execution unit 3 exchanges secondary proxy authentication messages 2 with the DST processing unit 2 and the DST processing unit 2 exchanges secondary dedication messages 2 with the user device 14. The DST execution unit 3 indicates favorable second level authentication when receiving favorable secondary proxy authentication messages 2. For example, the DST execution unit 3 indicates a favorable second level authentication when a good password and/or credential is received. As another example the DST execution unit 3 indicates the favorable second level authentication when a question (e.g., encrypting a nonce etc.) is answered correctly. Alternatively, the DST execution unit 3 indicates the favorable second-level authentication only when receiving a threshold number of favorable second-level authentication indications from other DST execution units based on the other DST execution units performing a similar second-level authentication on the secondary proxy authentication messages 2. When the secondary authentication process indicates that the user device 14 has been authenticated, the DST execution unit 3 de-queues the queued slice access message 2 for processing. Alternatively, each other DST execution unit also de-queues the queued slice access messages 2 for processing.

Figure 12:
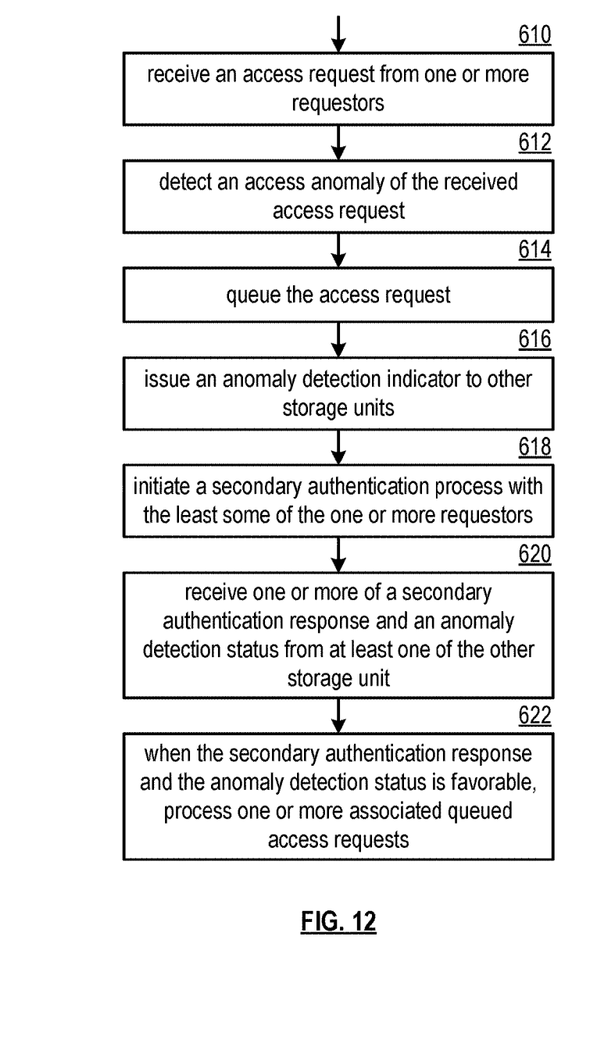
FIG. 12 is a flowchart illustrating an example of resolving a detected access anomaly in accordance with the present invention.

FIG. 12 is a flowchart illustrating an example of resolving a detected access anomaly. The method includes step 610 where a processing module (e.g., of a storage unit of a set of storage units) receives an access request from one or more requesters (e.g., user devices). The receiving includes at least one of receiving the access request directly from a requester and receiving a proxied access request via a proxy agent (e.g., a DST processing unit) of the one or more requesters.

The method continues at step 612 where the processing module detects an access anomaly of the received access request. The detecting includes at least one of detecting an unfavorable access pattern, detecting a new requester, detecting a new requester location, detecting one or more of favorable access times, detecting an access type associated with an access anomaly, and receiving an anomaly detection indicator from another storage unit of the set of storage units.

The method continues at step 614 where the processing module queues the access request. The queuing includes at least one of storing the access request in a local memory and associating the stored access request with one or more other storage access requests associated with the access request (e.g., a write request and a commit request for the same encoded data slice).

The method continues at step 616 where the processing module issues an anomaly detection indicator to other storage units. For example, the processing module generates the anomaly detection indicator to include one or more of the access request, and anomaly type, and an identifier of the requester. The method continues at step 618 where the processing module initiates a secondary authentication process with at least some of the one or more requesters. For example, the processing module issues a secondary authentication request to a requester (e.g., generate the secondary authentication request and send the generated secondary authentication request to the requester and/or a proxy of the requester).

The method continues at step 620 where the processing module receives one or more of a secondary authentication response and an anomaly detection status from at least one other storage unit. For example, the processing module receives the secondary authentication response from the requester and processes the received secondary authentication response to determine validity (e.g., answering a question, utilizing key pair is to authenticate a response, etc.).

When the secondary authentication response and the anomaly detection status is favorable, the method continues at step 622 where the processing module processes one or more associated queued access requests. For example, the processing module extracts the one or more associated queued access requests and processes the request in a sequence in accordance with a request type (e.g., write request, commit request, and finalize request of a three-phase storage process).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device that includes a processor, the method comprising:
    detecting an access anomaly associated with an access request from a requestor for a set of encoded data slices, the access anomaly having an unfavorable access pattern, wherein the set of encoded data slices is dispersed storage error encoded and stored in at least one storage unit of a storage network;
    denying the access request in response to detecting the access anomaly;
    generating, based on the unfavorable access pattern, an anomaly detection indicator identifying the requestor; and
    sending the anomaly detection indicator to other devices of the storage network.

2. The method of claim 1, wherein the method further comprises:
    initiating a secondary authentication process with the requestor;
    receiving a secondary authentication response from the requestor; and
    processing the access request when the secondary authentication response is favorable.

3. The method of claim 1, wherein the method further comprises:
    storing the access request in a local memory; and
    associating the access request with at least one other access request, wherein the at least one other access request includes a request for the set of encoded data slices.

4. The method of claim 3, wherein processing the access request includes:
    extracting the at least one other access request associated with the access request; and
    processing the access request and the at least one other access request in a sequence in accordance with a request type of the access request.

5. The method of claim 4, wherein the access request and the at least one other access request include a write request, a commit request, and a finalize request of a three-phase storage process.

6. The method of claim 1, wherein the access request is received via a dispersed storage and task (DST) processing unit that received the access request from the requestor.

7. The method of claim 1, wherein detecting the unfavorable access pattern corresponds to one of a plurality of anomaly types.

8. The method of claim 1, wherein detecting the access anomaly includes receiving a second anomaly detection indicator from another storage unit.

9. The method of claim 1, wherein the anomaly detection indicator includes the access request.

10. The method of claim 1, wherein another storage unit receives another access request associated with the requestor corresponding to the access request and queues the another access request in response to receiving the anomaly detection indicator.

11. A processing system of a storage network comprises:
    at least one processor;
    a memory that stores operational instructions that, when executed by the at least one processor, cause the processing system to perform operations that include:
    detecting an access anomaly associated with an access request from a requestor for a set of encoded data slices, the access anomaly having an unfavorable access pattern, wherein the set of encoded data slices is dispersed storage error encoded and stored in at least one storage unit of the storage network;
    denying the access request in response to detecting the access anomaly;
    generating, based on the unfavorable access pattern, an anomaly detection indicator identifying the requestor; and
    sending the anomaly detection indicator to other devices of the storage network.

12. The processing system of claim 11, wherein the operations further include:
    initiating a secondary authentication process with the requestor;
    receiving a secondary authentication response from the requestor; and
    processing the access request when the secondary authentication response is favorable.

13. The processing system of claim 11, wherein the operations further include:
    storing the access request in a local memory; and
    associating the access request with at least one other access request, wherein the at least one other access request includes a request for the set of encoded data slices.

14. The processing system of claim 13, wherein processing the access request includes:
    extracting the at least one other access request associated with the access request; and
    processing the access request and the at least one other access request in a sequence in accordance with a request type of the access request.

15. The processing system of claim 14, wherein the access request and the at least one other access request include a write request, a commit request, and a finalize request of a three-phase storage process.

16. The processing system of claim 11, wherein the access request is received via a dispersed storage and task (DST) processing unit that received the access request from the requestor.

17. The processing system of claim 11, wherein detecting the unfavorable access pattern corresponds to one of a plurality of anomaly types.

18. The processing system of claim 11, wherein detecting the access anomaly includes receiving a second anomaly detection indicator from another storage unit.

19. The processing system of claim 11, wherein the anomaly detection indicator includes the access request.

20. The processing system of claim 11, wherein another storage unit receives another access request associated with the requestor corresponding to the access request and queues the another access request in response to receiving the anomaly detection indicator.

* * * * *